United States Patent Office 3,128,238
Patented Apr. 7, 1964

3,128,238
Δ¹-DEHYDROGENATION OF STEROIDS BY FERMENTATION WITH ACTINOPLANACEAE
Gordon E. Mallett, Indianapolis, Ind., assignor to Eli Lilly and Company, Indianapolis, Ind., a corporation of Indiana
No Drawing. Filed Sept. 14, 1962, Ser. No. 223,806
7 Claims. (Cl. 195—51)

The present invention relates to steroids. More particularly, it relates to the Δ¹-dehydrogenation of steroidal substances.

The steroids, because of their extraordinary and diverse activities, have proved to be useful in the treatment of many disorders, both animal and human. During recent years it has been found that many of the steroids can be modified in desirable ways by introducing a double bond between carbons 1 and 2, and for this purpose, numerous means have been devised, both chemical and enzymatic. As examples of the latter technique, there may be cited the following patents:

Wettstein et al., U.S. Pat. 2,949,405 (August 16, 1960)
Terumichi, U.S. Pat. 2,992,973 (July 18, 1961)
Stoudt, U.S. Pat. 3,016,335 (January 9, 1962)
Ross, U.S. Pat. 3,022,226 (February 20, 1962)
Feldman, U.S. Pat. 3,037,912 (June 5, 1962)
Feldman, U.S. Pat. 3,037,913 (June 5, 1962)
Feldman, U.S. Pat. 3,037,914 (June 5, 1962)
Takeda et al., U.S. Pat. 3,037,915 (June 5, 1962)

The principal improvement arising out of the introduction of the Δ¹ double bond lies in the increased pharmaceutical activity of the product compared with that of the parent steroid. Prednisone, for example, is five times as active as its parent, cortisone. The introduction of the double bond likewise provides a reactive center by virtue of which the compounds become useful as intermediates for conversion to other substances, both known and novel.

The present invention affords an improved method whereby steroids can be subjected to Δ¹-dehydrogenation through enzymatic means, employing as a source of the enzyme system a microorganism of the genera Actinoplanes, Streptosporangium, Ampullaria, or Spirillospora from the family Actinoplanaceae.

It is an object of the present invention to improve the Δ¹-dehydrogenation of steroids.

Another object is to prepare Δ¹-dehydrogenated steroids more readily, cheaply, and conveniently.

Another object is to effect the hydroxylation of steroids.

Other objects of the invention and its advantages over the prior art will be apparent from the following description.

In accordance with the present invention, a 1-dehydrogenase is produced by growing microorganisms of the family Actinoplanaceae, genera I–IV as defined hereinafter, in a suitable culture medium, and the 1-dehydrogenase produced thereby is brought into contact with a steroid which is saturated in the 1(2) position and which has certain other structural characteristics as defined hereinafter, under conditions effective to cause Δ¹-dehydrogenation thereof.

In one embodiment of the invention, microorganisms of the genus Actinoplanes are grown under aerobic conditions in a culture medium containing assimilable carbon, nitrogen, and minerals. To the enzyme-containing culture thus obtained is added a quantity of the desired steroid substrate, and the incubation is continued. The steroid is thereby dehydrogenated in the 1(2) position, the conversions being readily followed by chromatographic means. When the dehydrogenation reaches substantial completion, the fermentation is discontinued, and the product is isolated in a known manner.

The desired 1-dehydrogenase is produced by the Actinoplanaceae in association with both the mycelial material and the fermentation broth. It is feasible to separate the enzyme from the fermentation beer or its components by extraction or by other known means, and to employ the enzyme for the desired dehydrogenation. Such an intermediate purification of the enzyme is by no means necessary, however, and the dehydrogenation is preferably carried out with the whole fermentation beer, or alternatively with the filtered broth, or with the mycelia alone in a suitable buffering medium. From the standpoint of economy and convenience, the use of the unfiltered beer is the method of choice.

The production of the 1-dehydrogenase takes place readily and effectively under the conditions satisfactory for growth of the Actinoplanaceae, viz., a temperature between about 25 and about 35° C. and a pH between about 6.5 and about 8.0, with agitation and aeration. The culture medium should contain an assimilable carbon source such as sucrose, glucose, glycerol, or the like, a nitrogen source such as peptone, urea, ammonium sulfate, or the like, and the several inorganic salts found generally to be effective to promote the growth of microorganisms. Maximum yield of the enzyme is generally approached in from about 24 to about 48 hours, although a useful quantity of the dehydrogenase is formed within a matter of hours after the beginning of the growth cycle, and persists for a considerable time after maximum growth has been reached. It will be understood that the amount of enzyme produced varies from species to species of the organism and in response to differences in growth conditions.

The Actinoplanaceae are a new family of microorganisms of the order Actinomycetales, having been first described by Dr. John N. Couch (Jour. Elisha Mitchell Sci. Soc., 65, 315–318 (1949); 66, 87–92 (1950); Trans. New York Acad. Sci., 16, 315–318 (1954); Jour. Elisha Mitchell Sci. Soc., 71, 148–155 and 269 (1955); Bergey's Manual of Determinative Bacteriology, Seventh Edition, 825–829 (1957)). They form inconspicuous vegetative mycelia in water on a variety of plant and animal parts, and reproduce by spores formed in sporangia, the spores varying in flagellation and motility, and conidia being formed in many species. The organisms are widely distributed in soil and fresh water, and are culturable in a variety of natural and artificial media. Five genera have thus far been distinguished, four of which are effective in the process of the present invention.

The type genus, I, Actinoplanes, comprises aerobic, Gram-positive, brillaint orange organisms with flagellated, motile spores, lacking aerial mycelia and coiled conidiophores.

Genus II, Streptosporangium, is nonpigmented and has abundant aerial mycelia, nonmotile sporangiophores, and (in some species) coiled conidiophores as well as sporangia.

Genus III, Ampullaria, has sporangia which are bottle-shaped, flask-shaped, digitate, or otherwise irregular; further distinguished by motile, rod-shaped, planospores with one polar flagellum, arranged end-to-end in longitudinal rows within the sporangium; grows saprophytically on a variety of plant and animal material; widely distributed in soils.

Genus IV, Spirillospora, has weakly motile spores which range from short to long rods to spiral in shape, developed from one or more coils in the sporangium; mycelia white to pale yellowish, simulating Streptosporangium; hypae 0.2–1 micron in diameter; sporangia spherical to vermiform.

Genus V, Amorphosporangium, has sporangia of very irregular shape; spores short rods, nonmotile. The two known species of this genus have not been found to be effective in the process of the present invention.

Among the species and varieties of the operative genera of the Actinoplanaceae which have been isolated and characterized are the following: *Actinoplanes utahensis, Actinoplanes missouriensis, Actinoplanes philippinensis, Streptosporangium roseum, Streptosporangium roseum* var. *hollandensis, Streptosporangium album, Streptosporangium viridialbum, Streptosporangium amethystogenes, Ampullaria regularis, Ampullaria campanulata, Ampullaria lobata, Ampullaria digitata,* and *Spirillospora albida.*

The Actinoplanaceae genera I–IV (i.e., Actinoplanes, Streptosporangium, Ampullaria, and Spirillospora) are operable as a group in the process of the present invention, although of course with varying degrees of effectiveness for the desired conversion. Best results have thus far been achieved with the type genus Actinoplanes, of which the species *Actinoplanes missouriensis* is preferred. Cultures of representative species of the organisms have been deposited with the American Type Culture Collection, from which they are available to the public, under accession numbers as follows:

| | |
|---|---|
| *Actinoplanes missouriensis* | ATCC 14538 |
| *Actinoplanes utahensis* | ATCC 14539 |
| *Streptosporangium roseum* var. *hollandensis* | ATCC 14540 |
| *Ampullaria regularis* | ATCC 14541 |
| *Spirillospora albida* | ATCC 14542 |

The process of the present invention is applicable to the conversion of the steroid compounds of the class which are saturated in the 1(2) position and which contain the 3-keto-$\Delta^4$ configuration or a structure convertible to the 3-keto-$\Delta^4$ configuration under the conversion conditions employed. Also operative are the 3-keto-$\Delta^{5(6)}$ compounds which are transformed into 3-keto-$\Delta^4$ derivatives under the conversion conditions employed, as well as the 3α-hydroxy-$\Delta^4$, 3α-hydroxy-$\Delta^{5(6)}$, 3β-hydroxy-$\Delta^4$, and 3β-hydroxy-$\Delta^{5(6)}$ compounds which are similarly converted. By "steroid" is meant the class of substances having the ring structure of the cyclopentanoperhydrophenanthrenes, including the derivatives thereof having substituents which do not interfere with the desired $\Delta^1$-dehydrogenation. Illustrative of the classes of compounds are the testanes, pregnanes, estranes, stigmastanes, fucostanes, cholestanes, sitostanes, corticoids, and the like. Preferred starting materials are the 3-keto-$\Delta^4$-androstenes, the 3-keto-$\Delta^4$-pregnenes, and the 3-keto-$\Delta^4$-estrenes. Among the starting materials which can be employed are the 3,20-diketo-$\Delta^4$-pregnene compounds, illustrated by progesterone; the monohydroxyprogesterones, such as 11α-hydroxyprogesterone, 9α-halo-11β-hydroxyprogesterone, 21 - fluoro-17α-hydroxyprogesterone, and 21-hydroxyprogesterone; the dihydroxyprogesterones, such as corticosterone, cortisone, 9α-halocortisones, and 12α-halocortisones; the trihydroxyprogesterones, such as hydrocortisone; and the tetrahydroxyprogesterones, such as 9α-fluoro-16α-hydroxyhydrocortisone. The expression "halo" includes fluoro, chloro, bromo, and iodo. Also included are the analogous androstene compounds, such as testosterone, androstadiene, 17-methylandrostadiene, 11β-hydroxytestosterone, 11β-hydroxy-9α-fluoro-17-methyltestosterone, and 2-methyltestosterone, as well as the analogous estrene compounds, i.e., the 19-nor analogues of the foregoing, such as 19-nortestosterone. Substituted steroids include 17-ethynyltestosterone, 17-ethyltestosterone, 17α-vinyltestosterone, cholesterol, stigmasterol, sitosterol, fucosterol, sarcasterol, brassicasterol, and the like.

It is to be understood that the starting material may, in addition to its essential configuration as defined above, contain other unsaturation and/or substituents which do not interfere with the $\Delta^1$-dehydrogenation process to which the invention primarily relates. Among such substituents are keto groups, particularly in the 11, 17, and 20 positions; hydroxy, alkoxy, and acyloxy groups, particularly in the 6, 11, 16, 17, 20, and 21 positions; fluoro, chloro, bromo, and iodo, particularly in the 9 position; alkyl groups in the range of about $C_1$ to $C_4$ in positions 2 and 4 on the A ring and in any position on the B, C, and D rings; alkyl groups above $C_4$ (e.g., $C_5$–$C_{10}$) on the D ring, particularly at positions 16 and 17; vinyl groups, particularly at position 17; and alkynyl groups containing up to 4 carbon atoms on the D ring, particularly ethinyl at position 17.

The steroid substrate employed in the invention is preferably added to the culture of Actinoplanaceae after the latter has been incubated for at least about 24 hours. The concentration of steroid substrate in the conversion medium can vary widely without detracting materially from the effectiveness of the conversion, but should preferably not exceed the toxic level for the microorganism, and should preferably not exceed the quantity which can be converted by the total amount of enzyme available. The concentration will generally range from about 0.1 to about 10 mg./ml., preferably around 0.2 to 2 mg./ml., for maximum utilization of the 1-dehydrogenase and for substantially complete $\Delta^1$-dehydrogenation. Lower concentrations can be employed, but may not make full use of the 1-dehydrogenase values present in the medium. Higher concentrations can also be employed up to or exceeding the saturation level (solid phase may be present), but in such case the starting material may not undergo complete $\Delta^1$-dehydrogenation without an extended fermentation time. As an illustration, 6α-fluoro-16α-methyl-4-pregnene-17α,21-diol-3,20-dione, because of its toxicity, should be converted at a concentration no higher than about 0.1–0.2 mg./ml. It will be recognized that the chemical and physical properties of the product may be quite similar to those of the starting material, inasmuch as the process removes only two hydrogen atoms from the latter. For this reason, it is desirable to carry the dehydrogenation substantially to completion so as to avoid the necessity for separating the dehydrogenated product from unconverted starting material.

The $\Delta^1$-dehydrogenation of steroids according to the present invention proceeds most satisfactorily at pH conditions in the neutral range, suitably between about 6.5 and about 8.5, and preferably between about 7.0 and about 7.5. The temperature may be chosen from a considerable range, suitably from about 20 to about 40° C. or somewhat higher, preferably about 25 to about 35° C., optimally around 30° C. If the conversion is carried out at temperatures above the growth level for the microorganism, the growth must have previously been allowed to continue to the point where a sufficient quantity of the 1-dehydrogenase enzyme was elaborated.

*Cultures.*—The Actinoplanaceae are readily maintained by slant-to-slant transfer on agar slants prepared from "Q medium," having the following composition:

| | | |
|---|---|---|
| Oatmeal, Heinz prepared | g | 20 |
| Sucrose | g | 20 |
| Yeast, Fleischmann's 2019 | g | 2.5 |
| BY500, butanol fermentation solubles | g | 5 |
| Mineral stock solution | ml | 5 |
| $K_2HPO_4$ | g | 1 |
| Distilled water | ml | 1000 |

The mineral stock solution has the following composition:

| | | |
|---|---|---|
| $FeSO_4 \cdot 7H_2O$ | g | 2 |
| Conc. HCl | ml | 2 |
| KCl | g | 100 |
| $MgSO_4 \cdot 7H_2O$ | g | 100 |
| Water, q.s. to 1 liter. | | |

The iron sulfate is dissolved in 100 ml. of water. The concentrated hydrochloric acid is added. The mixture is diluted with water to 800 ml., and the other salts are added and dissolved. Water is then added to a total volume of 1 liter.

For use in the preparation of slants, 2 percent by weight of agar is added to the Q medium. The ingredients are mixed, adjusted to pH 7.4 with 1 N sodium hydroxide solution, autoclaved for 30 minutes, dispensed into tubes, cooled, and inoculated. The inoculated slants are incubated at 28° C. for seven or eight days and stored at 4° C. until used. Pellets of the culture can conveniently be lyophilized, if desired, for storage at ordinary temperatures.

*Inoculum.*—A variety of media can be used to prepare inoculum for fermentors. A convenient and inexpensive medium is modified peptone Czapek medium having the following composition:

| | | |
|---|---|---|
| $K_2HPO_4$ | g | 1 |
| Sucrose | g | 30 |
| Peptone | g | 5 |
| Mineral stock solution | ml | 5 |
| Distilled water | ml | 1000 |

The ingredients are mixed, adjusted to pH 7.6 with 1 N sodium hydroxide solution, dispensed into 100-ml. Erlenmeyer flasks, and sterilized by heating at about 120° C. for about 20 minutes. Each flask is inoculated with a lyophilized pellet or with organisms scraped from about one-fourth of a slant and is incubated for two or three days at 28° C. on a rotary shaker, during which time luxuriant growth takes place.

Each of the vegetative flasks is used as inoculum for 800 ml. of medium in a 2-liter flask, which is similarly incubated. The resulting culture is commonly referred to in the fermentation art as the "bump" stage.

*Fermentor.*—Two "bump" stage flasks are thereafter used for inoculating 25 liters of medium in a 45-liter fermentor. The fermentors are incubated at around 28° C. with agitation at around 350 r.p.m. and aeration at around 1 volume of air per volume of medium per minute.

In every stage of culture preparation, it is found that the culture approaches maximum activity at about 24 to about 48 hours. It is active for the desired dehydrogenation almost from the beginning of the incubation, the rate of conversion being quite low during the early stages and increasing rapidly up to around 36 to 48 hours. The dehydrogenation can be carried substantially to completion regardless of the point at which the steroid is added to the fermentation mixture, assuming that the 1-dehydrogenase is eventually produced in the necessary amount, but the conversion is much more rapid if the steroid addition is withheld until around 24 hours.

*Conversion.*—The desired steroid substrate is added to the vegetative culture in the form of the solid steroid or preferably as a solution thereof in water, an organic solvent, or a mixture thereof. The concentration of steroid in the conversion mixture is preferably in the range of about 0.2 to about 2 mg./ml., although substantially lower and higher proportions can be used if desired. It is obviously desirable to make use of all of the 1-dehydrogenase present in the medium, but an excess of the steroid should be avoided in the interest of expediting recovery of the product. After addition of the steroid, the incubation is continued within the growth temperature range or somewhat higher, and the desired dehydrogenation goes forward rapidly, reaching substantial completion in from one to two days, at the end of which time the incubation is discontinued. The whole broth is thereupon filtered to remove the microorganisms and any other suspended matter, employing a suitable proportion of a diatomaceous filter aid, generally around 2 or 3 percent by weight.

*Product recovery.*—The filtered broth is subjected to extraction with an immiscible organic solvent such as ethyl acetate, butyl acetate, chloroform, methylene dichloride, or the like, depending upon the known solubility relationships of the product. The filtration solids may also be washed with the solvent. The extracts are combined, washed with water, buffered around the neutral point, and evaporated to dryness under reduced pressure. The solids are recrystallized from acetone, ether, ether-alcohol, or the like, or are subjected to chromatographic separation from organic solution according to conventional methods, employing a column packed with silica, alumina, or other adsorbent solid and petroleum ether containing a successively increasing proportion of acetone or ethyl acetate as the selective eluant. Numerous variants and extensions of the recovery procedure will be readily apparent.

*Hydroxylation.*—Extension of the fermentation time beyond about two days, e.g., three to four days or more, tends to add a hydroxyl group or groups at one or more places on the $\Delta^1$-dehydrogenated product, most usually at the 6 position. For example, 3-hydroxy-5-androstene-17-one is converted in about four days to a mixture of 6α- and 6β-hydroxy-1,4-androstadiene-3,17-dione. The same products are obtained from 3,17β-dihydroxy-5-androstene. In general it can be said that 6-hydroxylation is obtained upon extended treatment of the 3-hydroxy-5-testene series of compounds.

The invention will be more clearly understood from the following operating examples, which are intended to be illustrative only, and not as limitations on the scope of the invention.

EXAMPLE 1

*1,4-Pregnadiene-3,20-Dione*

The following example illustrates the conversion of progesterone to 1,4-pregnadiene-3,20-dione by fermentation with *Actinoplanes missouriensis.*

An inoculum was prepared by the following procedure. A lyophilized pellet of *Actinoplanes missouriensis* was introduced into a 500-ml. Erlenmeyer flask containing 100 ml. of sterile Q medium, and the seeded medium was grown at about 30° C. on a rotary shaker for six days.

The resulting inoculum was dispersed in 10-ml. portions into 500-ml. Erlenmeyer flasks containing 100-ml. portions of sterile Q medium, and the flasks were incubated at 30° C. on a rotary shaker for three days. At the end of this time, a solution of 50 mg. of progesterone in 2.5 ml. of methanol was dispensed into each of the flasks, and the fermentation was continued for four additional days. The flasks were then pooled and filtered.

The filtrate was extracted three times with 0.5 volume of fresh ethyl acetate. The filtration solids were washed twice with 1 volume of fresh ethyl acetate. The extracts and wash liquids were combined, washed twice with 0.1 volume of aqueous 2 percent sodium bicarbonate solution and twice with 0.1 volume of distilled water, dried with anhydrous sodium sulfate, and evaporated to dryness under vacuum.

The solid residue obtained thereby was dissolved in the minimum quantity of acetone and subjected to chromatography on a column packed with Florisil (a 60–100 mesh synthetic silica-magnesia gel) to a height approximately ten times the diameter of the column. The column was filled with Skellysolve F (a petroleum naphtha boiling at 35–60° C.) to a level above the Florisil such that the addition of the acetone solution of the residue produced an acetone concentration of about 2 percent by volume in the free space above the Florisil. The components of the residue were selectively eluted with Skellysolve F containing progressively increasing proportions of acetone starting at 2 percent by volume. The product peak was found in the fractions containing 5 percent acetone. These fractions were combined and were shown to be 1,4-pregnadiene-3,20-dione by paper chromatography and infrared analysis.

EXAMPLE 2

*1,4-Pregnadiene-3,20-Dione*

The following example illustrates the use of modified peptone Czapek medium for the conversion of progesterone to 1,4-pregnadiene-3,20-dione.

An inoculum was prepared by the following procedure. A lyophilized pellet of *Actinoplanes missouriensis* was introduced into a 500-ml. Erlenmeyer flask containing 100 ml. of sterile modified peptone Czapek medium, and the seeded medium was grown at about 30° C. on a rotary shaker for three days.

The resulting inoculum was dispensed in 4-ml. portions into 500-ml. portions of sterile modified peptone Czapek medium, and the flasks were incubated at 30° C. on a rotary shaker for three days. At the end of this time, a solution of 50 mg. of progesterone in 3 ml. of acetone was dispensed into each of the flasks, and the fermentation was continued for four additional days. The flasks were then pooled, filtered, and extracted as described in Example 1.

The washed extract was evaporated to dryness under vacuum. The residue obtained thereby was dissolved in ethyl ether and crystallized therefrom. The crystalline product, weighing 208 mg., melted at 144–147° C. and was shown to be 1,4-pregnadiene-3,20-dione by infrared analysis.

EXAMPLE 3

*1,4-Pregnadiene-21-Ol-3,20-Dione*

11-desoxycorticosterone, dissolved in the minimum amount of ethanol, was added to a three-day culture of *Actinoplanes missouriensis* in Q medium to a concentration of 50 mg. per 100 ml., and the fermentation was allowed to proceed for five days at 30° C. on a rotary shaker. The fermentation broth was filtered, extracted with ethyl acetate as described in Example 1, decolorized with Magnesol (an adsorptive magnesium silicate powder), and crystallized from the decolorized solution. The product was shown to be 1,4-pregnadiene-21-ol-3,20-dione by its melting point, 179–180° C., and infrared analysis. The yield of product was approximately 49 percent of theory.

EXAMPLE 4

*Prednisone*

Cortisone acetate was added to a three-day culture of *Actinoplanes missouriensis* in modified peptone Czapek medium to a concentration of 29 mg. per 100 ml., and the fermentation was allowed to go forward for four days at 30° C. on a rotary shaker. The fermentation product was filtered and extracted as described in Example 1. Paper chromatography of the product in the Zafferoni system (Burton et al., Science, 110, 442 (1949); 111, 6 (1950)) revealed the presence of prednisone. The principal product, after recrystallization from acetone, melted at 221–226° C. and was shown to be prednisone by infrared analysis. The recovered product weighed 18.2 mg. per 100 ml. of fermentation medium, corresponding to a yield of 70 percent of theory.

*Analysis.*—Calc. for prednisone: C, 70.4; H, 7.31. Found: C, 70.9; H, 7.81.

EXAMPLE 5

*1,4-Androstadiene-3,17-Dione From Androstene-3,17-Dione*

Androstene-3,17-dione, dissolved in the minimum amount of methanol, was added to a two-day culture of *Actinoplanes missouriensis* in modified peptone Czapek medium to a concentration of 50 mg. per 100 ml., and the fermentation was allowed to proceed for four days at 30° C. on a rotary shaker. The fermentation product was filtered, extracted, and crystallized as described in Example 2. The recrystallized product (from ethyl ether) melted at 132–135° C. and was shown to be 1,4-androstadiene-3,17-dione by infrared analysis. The product actually recovered weighed 23.7 mg. per 100 ml. of fermentation medium, corresponding to a yield of 47 percent of theory.

EXAMPLE 6

*1,4-Androstadiene-3,17-Dione From Dehydroepiandrosterone*

Dehydroepiandrosterone, dissolved in the minimum quantity of methanol, was added to a three-day culture of *Actinoplanes missouriensis* to a concentration of 50 mg. per 100 ml., and the fermentation was allowed to proceed for six days at 30° C. on a rotary shaker. The fermentation product was filtered, extracted, and crystallized as described in Example 2. The product was shown chromatographically and by infrared analysis to be 1,4-androstadiene-3,17-dione.

EXAMPLE 7

*Estradiol*

19-nortestosterone, dissolved in the minimum quantity of ethanol, was added to a three-day culture of *Actinoplanes missouriensis* in modified peptone Czapek medium to a concentration of 25 mg. per 100 ml., and the fermentation was allowed to proceed for five days at 30° C. on a rotary shaker. The fermentation product was filtered, extracted, and crystallized as in Example 2. The product, after recrystallization from a mixture of ethyl ether and acetone, melted at 255° C., and was indicated to be estradiol by its ultraviolet absorption spectrum, which showed a maximum in ethanol solution at 280 m$\mu$ having a relative intensity of 2100.

EXAMPLE 8

*17$\alpha$-Methyl-1-Androsten-17$\beta$-Ol-3-One*

17$\alpha$-methylandrostane-17$\beta$-ol-3-one, dissolved in the minimum quantity of methanol, was added to a three-day culture of *Actinoplanes missouriensis* in modified peptone Czapek medium to a concentration of 25 mg. per 100 ml., and the fermentation was allowed to proceed for five days at 30° C. on a rotary shaker. The fermentation product was filtered, extracted, and subjected to chromatography on a column packed with Florisil in Skellysolve F, following the procedure of Example 1. A fraction eluted with 10 percent acetone in Skellysolve F was shown by ultraviolet and infrared analyses to be 17$\alpha$-methyl-1-androsten-17$\beta$-ol-3-one.

EXAMPLE 9

*11$\alpha$-Hydroxy-1,4-Androstadiene-3,17-Dione*

11$\alpha$-hydroxytestosterone, dissolved in the minimum amount of acetone, was added to a three-day culture of *Actinoplanes missouriensis* in modified peptone Czapek medium to a concentration of 50 mg. per 100 ml., and the fermentation was allowed to proceed for five days at 30° C. on a rotary shaker. The fermentation product was filtered, extracted, and fractionated chromatographically according to the procedure of Example 1. Only one product was recovered, which was shown by ultraviolet, chromatographic, and infrared analyses to be 11$\alpha$-hydroxy-1,4-androstadiene-3,17-dione.

EXAMPLE 10

*6-Hydroxy-1,4-Androstadiene-3,17-Dione*

The following example illustrates a pilot-plant conversion of dehydroepiandrosterone by fermentation with Actinoplanes.

An Erlenmeyer flask containing 100 ml. of Q medium was seeded with a lyophilized pellet of *Actinoplanes missouriensis* and was incubated at 30° C. for approximately 2½ days on a rotary shaker. The resulting culture was divided in half and transferred to two 4-liter Erlenmeyer flasks, each containing 1 liter of modified peptone Czapek medium, and the flasks were incubated at 30° C. for 53 hours on a rotary shaker.

The inoculum thus obtained was added to 25 liters of modified peptone Czapek medium in a 45-liter agitated stainless-steel fermentor, and the mixture was incubated 50 hours at 30° C. with an agitator rate of 500 r.p.m. and an aeration rate of 0.5 volume of air per volume of medium per minute. At the end of this time, a solution of 15 g. of dehydroepiandrosterone in 300 ml. of acetone was added, and the fermentation was continued for 86 additional hours under the same conditions.

The fermentation broth (23.5 liters) was filtered with 2 percent Hyflo filter aid, yielding 22 liters of filtrate. The filtration solids were washed once with 4 liters of acetone and twice with 4-liter portions of chloroform. The wash liquids were combined with the filtered broth and extracted three times with chloroform, employing one-half volume of chloroform for each extraction. The spent broth was discarded. The chloroform extracts were combined (36 liters), washed twice with 0.1-volume portions of aqueous 2 percent sodium bicarbonate solution and twice with 0.1-volume portions of water, then concentrated to dryness under vacuum.

The solid residue thus obtained was dissolved in the minimum quantity of acetone and the solution was poured into a 2-cm. chromatographic column containing 300 g. of Florisil in Skellysolve F, with a sufficient reservoir of Skellysolve F above the Florisil to establish a 3 percent acetone concentration in the reservoir upon addition of the acetone solution. Elution was carried out with Skellysolve F containing an increasing proportion of acetone in stepwise increments, beginning with 3 percent by volume. The eluate was taken off in 250-ml. fractions, as follows.

| Acetone concentration: | Number of fractions |
|---|---|
| 3 vol.-percent | 20 |
| 4 vol.-percent | 55 |
| 5 vol.-percent | 25 |
| 10 vol.-percent | 27 |
| 15 vol.-percent | 43 |
| 20 vol.-percent | 30 |

Separation and tentative identification of the product components were followed by ultraviolet analysis and paper chromatography. Four major product peaks were observed, and the products therein were identified as follows:

In fractions 43–52, 1,4-androstadiene-3,17-dione.

In fractions 100–107, $\Delta^1$-dehydrotestosterone.

In fractions 128–140, 6$\beta$-hydroxy-1,4-androstadiene-3,17-dione, M.P. 200–204° C., absorption maximum at 244 m$\mu$ ($\epsilon$=14,600). *Analysis.*—Calc.: C, 75.97; H, 8.06. Found: C, 76.50; H, 8.22.

In the remaining fractions, 6$\alpha$-hydroxy-1,4-androstadiene-3,17-dione, M.P. 255–259° C., ultraviolet absorption maximum at 241.5 m$\mu$ ($\epsilon$=15,080). *Analysis.*—Calc.: C, 75.97; H, 8.06. Found: C, 76.35; H, 8.56.

EXAMPLE 11

17$\alpha$-Methyl-$\Delta^1$-Dehydrotestosterone

17$\alpha$-methyltestosterone (10 g. in 100 ml. of ethanol) was subjected to pilot-plant fermentation according to the procedure and under the conditions of Example 10, the fermentation period being 39 hours.

The fermentation broth (21.5 liters) was filtered and the filtrate (20 liters) was subjected to extraction according to the procedure of Example 10.

The solid residue obtained by the evaporation of the extract was subjected to chromatographic separation as in Example 10, the elution being carried out serially with 5, 10, and 15 percent acetone in Skellysolve F. Unconverted starting material weighing 4.1 g. was found in the 10 percent acetone eluate. The expected product, 17$\alpha$-methyl-$\Delta^1$-dehydrotestosterone, was found in the 15 percent acetone eluate in the amount of 2.05 g., and its identity was confirmed by paper chromatography and by ultraviolet and infrared analyses.

EXAMPLE 12

1,4-Pregnadiene-3,11,20-Trione 11-ketoprogesterone (10 g. in 330 ml. of acetone) was subjected to pilot-plant fermentation according to the procedure and under conditions essentially paralleling those of Example 10, the fermentation period being approximately 37 hours.

The fermentation broth (24 liters) was filtered, using 2 percent Hyflo filter aid. The filtration solids were washed once with acetone and twice with methylene dichloride, using in each case just enough of the wash liquid to cover the solids. The wash liquids were combined with the broth filtrate and extracted twice with 12-liter portions of methylene dichloride and once with a mixture of 4 liters of methylene dichloride and 8 liters of chloroform. The spent broth was discarded. The extracts were combined (41 liters), washed twice with 0.1-volume portions of aqueous 2 percent sodium bicarbonate solution and twice with 0.1-volume portions of water, then concentrated to dryness under vacuum. The extracted solids, weighing 17.29 g., were dissolved in 330 ml. of acetone and decolorized by treatment with Nuchar. The decolorized solution was evaporated to dryness under vacuum, and the solids were crystallized from a mixture of ether and ethyl acetate. The crystals weighed 5.0 g. and melted at 156–159° C. They were identified as 1,4-pregnadiene-3,11,20-trione by ultraviolet and infrared analyses. Further crystallizations gave a total yield of product of 7.1 g., corresponding to 71 percent of theory.

EXAMPLE 13

6$\alpha$-Fluoro-16$\alpha$-Methyl-1,4-Pregnadiene-17$\alpha$,21-Diol-3,20-Dione 6$\alpha$-fluoro-16$\alpha$-methyl-4-pregnene-17$\alpha$,21-diol-3,20-dione (5.0 g. in 500 ml. ethanol) was similarly fermented in 15 liters of medium for 48 hours. The fermentation broth (16 liters) was filtered and extracted according to a procedure paralleling that of Example 10. The solid residue obtained from the extract was washed with Skellysolve F to remove fats, then dissolved in 25 percent acetone in Skellysolve F and decolorized by passage through a 100-g. column of Florisil, clean solvent being used to purge the column. The total eluate (4 liters) showed a trace of the starting material and very prominent indication of its $\Delta^1$ derivative upon chromatographic analysis. The eluate was evaporated to dryness under vacuum and the solids were recrystallized from chloroform-ether. The crystalline product, weighing 3.35 g. and melting at 177–179° C., was identified as 6$\alpha$-fluoro-16$\alpha$-methyl-1,4-pregnadiene-17$\alpha$,21-diol-3,20-dione by paper chromatography and ultraviolet and infrared analyses. The yield of product was about 67 percent of theory.

EXAMPLE 14

1,4-Pregnadiene-11$\beta$-Ol-3,20-Dione

The following example illustrates the conversion of progesterone to 1,4-pregnadiene-11$\beta$-ol-3,20-dione by sequential fermentation, first with *Actinoplanes missouriensis*, then with *Curvularia lunata*.

A 44-liter stainless-steel fermentor containing 25 liters of modified peptone Czapek medium was inoculated with one liter of a 48-hour vegetative culture of *Actinoplanes missouriensis* and fermentation was allowed to proceed at 30° C. for 24 hours with agitation at 500 r.p.m. and aeration at the rate of 0.5 volume of air per volume of medium per minute.

At the end of this time, a solution of 7.5 g. of progesterone in 150 ml. of acetone was added, and the fermentation was continued under the same conditions for 14 additional hours. The $\Delta^1$-dehydrogenation was essentially completed at this point, as was demonstrated by paper chromatography.

To the fermentor was then directly added 1 liter of a second-stage vegetative culture of *Curvularia lunata* in a medium having the following composition adjusted to pH 7.0 with aqueous potassium hydroxide solution before being sterilized:

| | Wt.-percent |
|---|---|
| Malt extract, Difco | 5 |
| Sucrose | 1 |
| $NaNO_3$ | 0.2 |
| KCl | 0.05 |
| $MgSO_4 \cdot 7H_2O$ | 0.05 |
| $FeSO_4 \cdot 7H_2O$ | 0.05 |
| $K_2HPO_4$ | 0.1 |
| Tap water | Remainder |

The fermentation was continued under the same conditions, the course of the conversion being followed by paper chromatography. At the end of 48 additional hours, the $\Delta^1$-dehydroprogesterone spot had completely disappeared, and only the 1,4-pregnadiene-11β-ol-3,20-dione spot remained, with a trace of more polar material. At this point, the fermentation liquor was heated at 115° C. for five minutes to stop the fermentation, then cooled.

The fermentation liquor (24 liters) was filtered and subjected to extraction essentially according to the procedure of Example 10. The solids obtained by evaporation of the extract were washed with Skellysolve F. The wash liquid, when analyzed chromatographically, revealed only traces of progesterone or its derivatives, and was discarded.

The washed solids were dissolved in 5 percent acetone-Skellysolve F and chromatographed on a column packed with Florisil in Skellysolve F. Selective elution was carried out with 10 percent acetone-Skellysolve F, then 15 percent acetone-Skellysolve F. From the eluate fractions were isolated 2.05 g. of 1,4-pregnadiene-11β-ol-3,20-dione, corresponding to a yield of about 26 percent of theory, the identity of the product being confirmed by ultraviolet and infrared analyses. Also recovered was a small quantity of a dihydroxylated product, not identified.

EXAMPLE 15

*6α-Fluoro-16α-Methylprednisolone*

The following example illustrates the sequential conversion of 6α-fluoro-16α-methyl-4-pregnene-17α,21-diol-3,20-dione, first with *Curvularia lunata*, then with *Actinoplanes missouriensis*, to form 6α-fluoro-16α-methylprednisolone.

*Curvularia lunata* was grown for 34 hours at 25° C. in a 10,000 gallon fermentor containing a medium (designated for convenience as "SX–4B medium") having the following composition:

| | Wt.-percent |
|---|---|
| Yeast, Anheuser-Busch "AB" | 0.1 |
| Cerelose | 2 |
| $(NH_4)_2HPO_4$ | 0.5 |
| $K_2HPO_4$ | 0.1 |
| $MgSO_4 \cdot 7H_2O$ | 0.02 |
| KCl | 0.05 |
| $ZnSO_4$ | 0.001 |
| $FeSO_4 \cdot 7H_2O$ | 0.001 |
| $CaCO_3$ | 0.1 |
| Water | Remainder |

At the end of this time, 250 gallons of the whole fermentation liquor were transferred to a 330-gallon black-iron fermentor, and 6α-fluoro-16α-methyl-4-pregnene-17α,21-diol-3,20-dione was added as 2 liters of a 7.5 percent suspension in water, giving a concentration of 0.15 mg./ml. The fermentation was resumed at 30° C., 500 r.p.m., and 0.5 volume of air per volume of medium per minute. After 36 hours, paper chromatograms showed no substrate spot.

A portion of the fermentation broth was withdrawn and filtered, and a 2.5-liter aliquot was mixed with 2.5 liters of a 76-hour vegetative culture of *Actinoplanes missouriensis* in modified peptone Czapek medium contained in a 7.5-liter stainless-steel fermentor. This mixture was fermented for 24 hours at 30° C., 500 r.p.m., and 0.5 volume of air per volume of medium per minute. At the end of this time, the fermentation was discontinued and the fermentation broth was filtered and extracted essentially according to the procedure of Example 10.

The residue obtained from the extract was taken up in a 1:4 mixture of methylene dichloride and acetone. The solution was evaporated three times to half its volume, with intervening filtration to remove the crystals thus obtained. These crystals were artifacts of unknown composition. The final solution volume obtained in this way measured approximately 10 ml. This liquid was diluted with 140 ml. of Skellysolve F and allowed to stand overnight. The resulting precipitate was filtered off. Paper chromatography of the precipitate showed no starting material, but six distinctly more polar spots.

The main body of the precipitate was dissolved in 10 ml. of pyridine and acetylated by adding 5 ml. of acetic anhydride per gram of solids and allowing to stand for two hours. Water was then added slowly with stirring over a period of about two hours, and the resulting oil phase was separated, dissolved in acetone, and crystallized. The crystals were shown by infrared analysis to be 6α-fluoro-16α-prednisolone 21-acetate. Chromatographic analysis showed only the same substance in the mother liquor.

Thus, it was shown that sequential fermentation with *Curvularia lunata*, then with *Actinoplanes missouriensis*, led to complete conversion of 6α-fluoro-16α-methyl-4-pregnene-17α,21-diol-3,20-dione via the 11β-hydroxylated intermediate into 6α-fluoro-16α-methylprednisolone.

I claim:

1. A process for introducing a double bond between positions 1 and 2 of a steroid wherein said positions are fully hydrogenated, said steroid being further characterized by having a configuration selected from the group consisting of 3-keto-$\Delta^4$, 3-keto-$\Delta^{5(6)}$, 3α-hydroxy-$\Delta^4$, 3α-hydroxy-$\Delta^{5(6)}$, 3β-hydroxy-$\Delta^4$, and 3β-hydroxy-$\Delta^{5(6)}$, which comprises bringing said steroid into contact with an enzyme system elaborated by a microorganism of the family Actinoplanaceae, genera Actinoplanes, Streptosporangium, Ampullaria, and Spirillospora.

2. The process of claim 1 wherein the microorganism is a member of the genus Actinoplanes.

3. The process of claim 2 wherein the microorganism is *Actinoplanes missouriensis*.

4. A process for introducing a double bond between positions 1 and 2 of a steroid wherein said positions are fully hydrogenated, said steroid being further characterized by having a configuration selected from the group consisting of 3-keto-$\Delta^4$, 3-keto-$\Delta^{5(6)}$, 3α-hydroxy-$\Delta^4$, 3α-hydroxy-$\Delta^{5(6)}$, 3β-hydroxy-$\Delta^4$, and 3β-hydroxy-$\Delta^{5(6)}$, which comprises subjecting said steroid to the fermentative action of a microorganism of the family Actinoplanaceae, genera Actinoplanes, Streptosporangium, Ampullaria, and Spirillospora.

5. A process for introducing a double bond between positions 1 and 2 of a steroid wherein said positions are fully hydrogenated, said steroid being further characterized by having a configuration selected from the group consisting of 3-keto-$\Delta^4$, 3-keto-$\Delta^{5(6)}$, 3α-hydroxy-$\Delta^4$, 3α-hydroxy-$\Delta^{5(6)}$, 3β-hydroxy-$\Delta^4$, and 3β-hydroxy-$\Delta^{5(6)}$, which comprises introducing said steroid into a fermentation medium comprising assimilable carbon, nitrogen, and mineral salts and a microorganism of the family Actinoplanaceae, genera Actinoplanes, Streposporangium, Ampullaria, and Spirillospora, and incubating the resulting mixture until substantial $\Delta^1$-dehydrogenation of said steroid has taken place.

6. A process for introducing a double bond between positions 1 and 2 of a steroid wherein said positions are fully hydrogenated, said steroid being further characterized by having a configuration selected from the group consisting of 3-keto-$\Delta^4$, 3-keto-$\Delta^{5(6)}$, 3α-hydroxy-$\Delta^4$, 3α-hydroxy-$\Delta^{5(6)}$, 3β-hydroxy-$\Delta^4$, and 3β-hydroxy-$\Delta^{5(6)}$, which comprises growing a microorganism of the family Actinoplanaceae, genera Actinoplanes, Streptosporangium, Ampullaria, and Spirillospora, in a culture medium containing assimilable carbon, nitrogen, and mineral salts, adding said steroid to the resulting culture, and incubating the resulting mixture under conditions and for a time effective to cause $\Delta^1$-dehydrogenation of said steroid.

7. A process for converting a 3-hydroxy-5-testene into a 6-hydroxy-$\Delta^1$-testene which comprises introducing said 3-hydroxy-5-testene into a fermentation medium comprising assimilable carbon, nitrogen, and mineral salts and a microorganism of the family Actinoplanaceae, genera Actinoplanes, Streptosporangium, Ampullaria, and Spirillospora, and incubating the resulting mixture for a period in excess of about three hours until the desired conversion has taken place.

References Cited in the file of this patent
UNITED STATES PATENTS

| | | |
|---|---|---|
| 2,949,405 | Wettstein et al. | Aug. 16, 1960 |
| 2,992,972 | Murray et al. | July 18, 1961 |